United States Patent Office 3,469,959
Patented Sept. 30, 1969

3,469,959
ALUMINOSILICATE ZEOLITE IN A SYNTHETIC RESIN BONDED ABRASIVE ARTICLE
Harold A. Stein, Niagara Falls, N.Y., assignor to The Carborundum Company, Niagara Falls, N.Y., a corporation of Delaware
No Drawing. Filed Sept. 8, 1966, Ser. No. 577,834
Int. Cl. C08g *51/12;* C04b *31/16*
U.S. Cl. 51—298       5 Claims

ABSTRACT OF THE DISCLOSURE

Bonded abrasive articles containing from about 2% to about 30% finely divided aluminosilicate zeolite molecular sieve adsorbent are relatively free of pores or voids formed during molding and curing operations, but are relatively unaffected by moisture in the atmosphere.

---

This invention relates to bonded abrasive articles and more particularly to resinoid bonded abrasive articles incorporating additives for absorbing water and other products given off within such articles during the production thereof.

In producing resinoid bonded abrasive articles water and other by-products generated by the resin during curing, form pockets or voids within the bonded article which weaken the bond and reduce the useful life of the article. Such pockets or voids are particularly bad when forming resinoid bonded abrasive articles using as bonds condensation type resins. During heating, pores in the bonded abrasive article may be formed by such by-products being driven out. It is therefore desirable that such products be removed or so tied up that voids and pockets are not formed.

Since water is one of the main volatile by-products formed during resinoid bond formation, it has been the practice to include additives in the raw mix used for resin bonded abrasive articles to adsorb and/or absorb the water thus formed. The additive most generally used is calcium oxide which is well-known for its water absorption characteristics. The calcium oxide reacts with the water given off during molding and curing and is converted to calcium hydroxide. The amount of calcium oxide added to the bonded abrasive article, however, must be closely controlled since unreacted calcium oxide remaining in the finished article will later react therein with moisture from the surrounding atmosphere to form calcium hydroxide. This subsequent formation of calcium hydroxide in the bonded abrasive article is usually harmful because the reaction of calcium oxide with water is accompanied by an increase in volume which can disrupt the bond and reduce the strength of the finished article.

Accordingly it is an object of this invention to provide improved bonded abrasive articles.

A further object of this invention is to provide bonded abrasive articles that are relatively free of pores or voids formed during the molding and curing of said article by condensation reaction by-products.

A further object of this invention is to provide a bonded abrasive article which is relatively unaffected by moisture in the atmosphere.

These and other objects and advantages of this invention will be apparent from the following description and the claims appended hereto.

The objects and advantages of this invention are achieved by incorporating in bonded abrasive articles that comprise abrasive grain and resin bonds, molecular sieve adsorbents for the purpose of adsorbing the volatiles, mainly water, produced by the resin-forming reactions.

Molecular sieves are materials that adsorb and hold molecules selectively on the basis of the size and shape of the adsorbate molecule. Molecular sieves useful in the present invention are finely divided alumino-silicates of the zeolite type, i.e., which are characterized by a crystalline structure having a three-dimensional framework of $SiO_4$ and $AlO_4$ tetrahedra cross-linked by oxygen atoms and by the presence of pores of molecular dimensions and relatively uniform size that are formed by removing water of hydration. Molecular sieves produced from either natural zeolites such, for example, as chabazite and mordenite or synthetic zeolites may be employed. The latter may be produced by the procedures described in the prior art, for example, U.S. Patent No. 2,882,243 or British Patent No. 983,756.

Molecular sieves may be used as adsorbents in any resin system which can be cured below a temperature of about 320° C. In general molecular sieves held above this temperature do not act as adsorbents and thus would not perform their desired function in producing abrasive articles. The use of molecular sieves in bonded abrasive articles is particularly desirable when bonding such articles with resins which, during molding and curing, react with the formation of volatiles such as water and ammonia. Such resins, broadly classified as condensation type resins, include, but are not limited to: phenol-formaldehyde resins, resorcinol resins, furfural resins, urea-formaldehyde resins, melamine resins, polyester and polyether resins, and polyamide resins.

Resinoid bonded abrasive articles made according to this invention may include any desired abrasive material such as diamond, silicon carbide, quartz, fused alumina and/or combinations of these with each other and/or other abrasive material. This invention is of particular value in diamond abrasive articles because the dense structure usually desired therein is quite sensitive to weakening through the action of volatiles.

Resinoid bonded abrasive articles made according to this invention may have filler materials incorporated therein. For example, in forming diamond abrasive articles, it is common to use silicon carbide as a filler material. It is also common to incorporate fillers such, for example, as pyrite and cryolite in abrasive articles in order to enhance the grinding characteristics of the article. Therefore the use of any suitable and conventional filler is considered to be within the scope of the invention.

Bonded abrasive wheels made according to this invention have unexpectedly improved grinding efficiencies over grinding efficiencies of similar wheels using the standard water absorbent, calcium oxide. In addition, it has been discovered that bonded abrasive articles made ac- in tensile strength and modules of rupture at elevated in tensile strength and modules of rupture at elevated temperatures over bonded abrasive articles made without the use of a molecular sieve adsorbent in the articles.

The following examples illustrate a method for producing improved abrasive wheels according to the present invention. It should be clearly understood that the abrasive grain, the resinoid bond, and the filler can be varied or changed without departing from the scope of this invention.

In producing improved abrasive articles according to the present invention the articles may be molded and cured in any preferred known manner provided the temperature is not raised above about 320° C. In the following two examples general procedures for making abrasive wheels of two different types are set forth.

EXAMPLE I

To form an abrasive wheel such as an annular DIAI type wheel a premolded nonabrasive center, for example, a disc of aluminum-filled phenolic resin, is centered in a mold of greater diameter than the disc and the granular abrasive mix is placed in the mold around the center. The abrasive mix is then consolidated and pressed at a suitable temperature and pressure and thereafter, if necessary, heat cured. This gives an abrasive wheel in which an annular abrasive portion is secured to the periphery of a nonabrasive center disc. Apparatus and procedure adapted for the carrying out of this method are more fully described in Sanford U.S. Patent No. 2,137,986.

Although aluminum filled resin centers are mentioned above other types of centers such as, for example, cast aluminum or asbestos rag filled-resin, may be employed.

EXAMPLE II

To form an abrasive wheel such as a cup-wheel used for side grinding the desired abrasive mix is merely placed in a mold having the desired contour on the mold bottom and pressed at a suitable temperature and pressure to produce the desired density. If necessary or desired curing can be carried out at an elevated temperature after removing the wheel from the mold.

As indicated above other molding and curing procedures can be used and it is evident that other abrasive articles such as hones, inserts, segments, and the like can also be produced in suitable molds.

Although the precise temperatures required or preferred in molding and curing the abrasive articles made in accordance with the present invention and the pressures used in molding such articles will vary depending upon such factors as: the precise resins used, the intended use of the articles, the size and shape of the articles, and the types of equipment employed, in general molding temperatures of from about 130° C. to about 180° C. and curing temperatures up to about 205° C. are satisfactory and molding pressures of from about 125 kg./cm.$^2$ to 420 kg./cm.$^2$ may be used.

EXAMPLES III–VIII

The following table sets forth exemplary abrasive mixes that illustrate the wide scope of compositions that can be used in producing abrasive articles in accordance with the present invention.

| Ex. | Abrasive, percent | Filler, percent | Bond, percent | Molecular sieves, percent |
|---|---|---|---|---|
| 3 | 37 diamond | 35 SiC | [1] 26 | 2 |
| 4 | 40 diamond | | [1] 27 | 30 |
| 5 | 50 SiC | 12 feldspar | [2] 28 | 10 |
| 6 | 65 Al$_2$O$_3$ | 10 cryolite | [3] 21 | 2 |
| 7 | 70 Al$_2$O$_3$ | 15 cryolite | [1] 12 | 3 |
| 8 | 72 SiC | | [1][4] 26 | 2 |

[1] A heat hardenable phenolic resin provided by the condensation of phenol and formaldehyde.
[2] Mixture of phenol-formaldehyde and phenol-furfuraldehyde resin.
[3] Urea-formaldehyde resin produced by condensation of urea and formaldehyde.
[4] 2% of furfural is included to assist in wetting the abrasive.

In making abrasive articles from the abrasive mixes set forth above the particle size of the abrasive and filler may vary within wide limits as desired. However in wheels made for tests the diamond abrasive used had an average particle size of about 100 microns. With the other abrasive materials the particle size may be greater or smaller depending upon the intended use. Generally it is desirable to have the filler materials, where used, of smaller average particle size than the abrasive.

As indicated above abrasive wheels made according to this invention show very good grinding efficiencies. For example, a wheel was made according to the procedure of Example I, using in the abrasive portion an abrasive mix according to Example III, and tested for grinding efficiency. For a comparison a similar wheel was made under the same conditions and using the same materials except that 2 percent calcium oxide, a standard water absorbent incorporated in prior art abrasive wheels, was used in place of the molecular sieves. The wheel including molecular sieves therein had a grinding efficiency 163 percent that of the wheel including calcium oxide.

As was also indicated above, articles made according to this invention unexpectedly have improved physical characteristics at higher temperatures, an important feature, particularly where the finished article is to be used for heavy duty grinding operations. For example, articles made from the abrasive mix of Example VIII have been found to have an increase in flexural strength and modulus of elasticity at higher temperatures as compared to standards prior art resinoid bonded articles. Although it is not completely understood why the addition of zeolite molecular sieves should increase the physical properties of resinoid bonded articles at elevated temperatures, it is theorized that the zeolite molecular sieves are able to hold the adsorbed volatiles so strongly that these products are unable to expand within the article as the temperature increases. This expansion within the article would tend to cause stress therein which would weaken the bond and eventually result in failure of the article.

It is thought that for best results the pores of the adsorbent should be relatively close in size to that of the molecules to be adsorbed. In the resin systems used to illustrate this invention the primary volatile product is water, which has a critical molecular dimension of 3.15 A., thus making it preferable to employ molecular sieves having 4 A. pores. For condensation reaction products having larger molecular sizes zeolite molecular sieves having larger crystalline pores may be used in order to allow for the adsorption of the larger size molecules. Molecular sieve material can be used more efficiently in production than the CaO formerly used for absorbing water since it can be activated by heating it to temperatures slightly above about 315° C. thereby removing any adsorbed moisture thus insuring that the material used in the product will be effective.

Unless otherwise stated all percentages used throughout this specification and the appended claims are percentages by weight.

While this invention has been described in connection with specific embodiments thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth and as fall within the scope of the invention or the limits of the appended claims.

I claim:

1. A bonded abrasive article having an abrasive portion comprising abrasive grain and a resin bond, the resin being selected from the group consisting of phenol-formaldehyde resins, resorcinol resins, furfural resins, urea-formaldehyde resins, melamine resins, polyester and polyether resins, polyamide resins, and mixtures thereof; characterized by containing in said abrasive portion from about 2 percent to about 30 percent by weight of the abrasive portion of a finely divided molecular sieve adsorbent, the adsorbent comprising at least one aluminosilicate zeolite which is at least partially anhydrous, whereby volatiles produced by the resin bond-forming reactions are adsorbed and said abrasive portion is substantially free of pores and voids formed by said volatiles.

2. A bonded abrasive article as defined in claim 1 wherein said abrasive is diamond.

3. A bonded abrasive article as defined in claim 2 wherein said molecular sieve adsorbent is synthetic zeolite.

4. A raw batch for the manufacture of the bonded abrasive article of claim 1 containing the following ingredients by weight:

| | Percent |
|---|---|
| Abrasive grain | 37–72 |
| Resin | 12–28 |
| Filler | Up to 35 |
| Molecular sieve adsorbent | 2–30 | the resin being selected from the group consisting of phenol-formaldehyde resins, resorcinol resins, furfural resins, urea-formaldehyde resins, melamine resins, polyester and polyether resins, polyamide resins, and mixtures thereof; and the molecular sieve adsorbent comprising at least one aluminosilicate zeolite which is at least partially anhydrous.

5. The raw batch as defined in claim 4 wherein said molecular sieve adsorbent is synthetic zeolite.

References Cited

UNITED STATES PATENTS

| 2,078,830 | 4/1937 | Benner et al. | 51—298 |
| 2,083,719 | 6/1937 | Kuzmick et al. | 51—298 |
| 2,308,983 | 1/1943 | Kistler | 51—295 |
| 2,592,954 | 4/1952 | Robie | 51—298 |

DONALD J. ARNOLD, Primary Examiner

U.S. Cl. X.R.

51—308